US009414321B2

(12) United States Patent
Fan et al.

(10) Patent No.: US 9,414,321 B2
(45) Date of Patent: Aug. 9, 2016

(54) UPLINK POWER CONTROL FOR MU-MIMO

(75) Inventors: Rui Fan, Beijing (CN); Qianxi Lu, Beijing (CN); Zhenshan Zhao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 14/368,005

(22) PCT Filed: Dec. 23, 2011

(86) PCT No.: PCT/CN2011/002171
§ 371 (c)(1),
(2), (4) Date: Jun. 23, 2014

(87) PCT Pub. No.: WO2013/091148
PCT Pub. Date: Jun. 27, 2013

(65) Prior Publication Data
US 2014/0369220 A1     Dec. 18, 2014

(51) Int. Cl.
*H04W 52/14*     (2009.01)
*H04W 24/08*     (2009.01)
(Continued)

(52) U.S. Cl.
CPC ........... *H04W 52/146* (2013.01); *H04B 7/0452* (2013.01); *H04W 24/08* (2013.01); *H04W 52/241* (2013.01); *H04W 52/346* (2013.01); *H04W 52/42* (2013.01); *H04W 52/267* (2013.01)

(58) Field of Classification Search
CPC . H04B 7/0413; H04B 7/0452; H04W 52/246; H04W 24/08; H04W 52/146; H04W 52/243; H04W 52/244; H04W 52/241; H04W 52/346; H04W 52/42
See application file for complete search history.

(56) References Cited

U.S. PATENT DOCUMENTS

| 8,615,052 | B2 * | 12/2013 | Gomadam | ........... | H04B 7/0452 |
| | | | | | 375/260 |
| 8,644,422 | B2 * | 2/2014 | Gao | ...................... | H04B 7/0452 |
| | | | | | 375/316 |

(Continued)

FOREIGN PATENT DOCUMENTS

| CN | 102084708 A | 6/2011 |
| EP | 2252117 A1 | 11/2010 |
| WO | 2011049286 A1 | 4/2011 |

OTHER PUBLICATIONS

Supplementary European Search Report having a mailing date of Jul. 10, 2015 from corresponding European Application No. EP 11878088.1, 7 pages.

*Primary Examiner* — Ahmed Elallam
(74) *Attorney, Agent, or Firm* — Rothwell, Figg, Ernst & Manbeck, P.C.

(57) ABSTRACT

A method of power control for multi-user multi-input multi-output (MU-MIMO) transmissions between a pair of mobile terminals and a radio base station. The method comprises determining signal-to-interference-noise ratios (SINRs) for the radio channels between the mobile terminals and the radio base station, determining a channel orthogonality between the radio channels, and jointly determining, based on the SINRs and the channel orthogonality, power adjustment values for the mobile terminals. The present invention makes use of an understanding that the system gain resulting from MU-MIMO transmissions may be improved by optimizing the transmission power of the co-scheduled mobile terminals. For instance, the power adjustment values may be determined so as to attain certain SINR targets. Alternatively, the power adjustment values may be determined so as to maximize the throughput while maintaining a power budget constraint. Further, a radio base station for MU-MIMO transmissions is provided.

12 Claims, 4 Drawing Sheets

(51) Int. Cl.
  *H04B 7/04* (2006.01)
  *H04W 52/42* (2009.01)
  *H04W 52/24* (2009.01)
  *H04W 52/34* (2009.01)
  *H04W 52/26* (2009.01)

(56) References Cited

U.S. PATENT DOCUMENTS

| | | | | |
|---|---|---|---|---|
| 8,699,429 B2* | 4/2014 | Zhou | ............... | H04B 7/065 370/328 |
| 8,880,114 B2* | 11/2014 | Bergman | ............... | H04B 7/0404 455/127.1 |
| 9,001,795 B2* | 4/2015 | Lau | ............... | H04W 52/12 370/335 |
| 9,031,146 B2* | 5/2015 | Shin | ............... | H04B 7/0689 375/267 |
| 2009/0190485 A1 | 7/2009 | Bjorkegren et al. | | |
| 2009/0323849 A1* | 12/2009 | Bala | ............... | H04B 7/0417 375/267 |
| 2010/0034146 A1* | 2/2010 | Hou | ............... | H04B 7/024 370/328 |
| 2010/0086072 A1* | 4/2010 | Mazet | ............... | H04B 7/0413 375/267 |
| 2011/0081935 A1* | 4/2011 | Yeon | ............... | H04W 52/146 455/522 |
| 2011/0164668 A1 | 7/2011 | Hoek et al. | | |
| 2012/0115534 A1* | 5/2012 | Luo | ............... | H04W 52/286 455/522 |

* cited by examiner

UPLINK POWER CONTROL FOR MU-MIMO

CROSS-REFERENCE TO RELATED APPLICATION

This application is a 35 U.S.C. §371 National Phase Entry Application from PCT/CN2011/002171, filed Dec. 23, 2011, and designating the United States.

TECHNICAL FIELD

The invention relates in general to Long Term Evolution (LTE) wireless communications, and more specifically to uplink power control in multi-user multiple-input multiple-output (MU-MIMO) transmissions.

BACKGROUND

In Release 8 of 3GPP, the user equipment (UE) supports multiple receive antennas but only a single transmit antenna. As such, single-user MIMO (SU-MIMO) can only be supported in the downlink, but MU-MIMO can be supported in the uplink.

MU-MIMO allows for uplink transmissions from multiple UEs to a radio base station, e.g., an eNode-B, using common time-frequency resources, i.e., schedule blocks. To separate the transmissions, MU-MIMO relies on the availability of multiple receive antennas at the radio base station and on significantly different spatial radio channels between the UEs and the radio base station.

An important benefit of uplink MU-MIMO is that a similar gain in system throughput as in SU-MIMO may be achieved, without need for multiple transmit antennas at the UE. This allows for a less complex implementation of UEs, i.e., handsets. However, the potential system gain of uplink MU-MIMO relies on more than one UE being available for transmission using a common time-frequency resource. The process of "pairing" UEs for MU-MIMO transmissions is non-trivial and requires favorable radio-channel conditions.

Ideally, paired, i.e., co-scheduled, UEs should have orthogonal channels in order to minimize mutual interference. If the transmissions from two UEs can be perfectly separated at the receiver, and both signals are transmitted with the same power as in single-user mode, there is a potential 100% gain in cell or user throughput due to the increased transmission power. However, co-scheduled UEs are seldom ideally orthogonal, giving rise to mutual interference. The more orthogonal the channels are the less intra-cell interference will be created by MU-MIMO. At the same time, the increase of total transmission power on the schedule blocks used for MU-MIMO transmissions will increase inter-cell interference, thereby reducing the potential gain.

SUMMARY

It is an object of the present invention to provide a more efficient alternative to the above techniques and prior art.

More specifically, it is an object of the present invention to provide an improved power control for MU-MIMO transmissions. In particular, it is an object of the present invention to provide an improved power control for uplink MU-MIMO transmissions in LTE communication networks.

These and other objects of the present invention are achieved by means of a method of uplink MU-MIMO wireless transmissions defined in independent claim 1, and by means of a radio base station having the features defined in independent claim 8. Embodiments of the invention are characterized by the dependent claims.

For the purpose of describing the present invention, a radio base station may, e.g., be a Node B, an eNode-B, an access point, or any other type of device capable of supporting uplink MU-MIMO wireless transmissions. Further, a mobile terminal may, e.g., be a UE, a mobile phone, a modem, a portable computer, a handset, or any other type of device capable of supporting uplink MU-MIMO wireless transmissions. In this respect, uplink transmissions are transmissions from the mobile terminal to the radio base station. It will also be appreciated that, in order to support uplink MU-MIMO transmissions, downlink control signaling, i.e., from the radio base station to the mobile terminal, may be required.

According to a first aspect of the invention, a method of power control for uplink MU-MIMO wireless transmissions between a pair of mobile terminals and a radio base station is provided. The pair of mobile terminals comprises a first mobile terminal and a second mobile terminal. The method comprises determining a first single-user signal-to-interference-noise ratio (SU-SINR), determining a second SU-SINR, determining a channel orthogonality, and jointly determining a first power adjustment value and a second power adjustment value. The first SU-SINR pertains to a first radio channel between the first mobile terminal and the radio base station. The second SU-SINR pertains to a second radio channel between the second mobile terminal and the radio base station. The channel orthogonality is the degree of orthogonality between the first radio channel and the second radio channel. The first power adjustment value pertains to the first mobile terminal. The second power adjustment value pertains to the second mobile terminal. The first power adjustment value and the second power adjustment value are determined based on the first SU-SINR, the second SU-SINR, and the channel orthogonality.

According to a second aspect of the invention, a radio base station is provided. The radio base station is arranged for uplink MU-MIMO wireless transmissions between a pair of mobile terminals and the radio base station. The pair of mobile terminals comprises a first mobile terminal and a second mobile terminal. The radio base station comprises a channel condition estimation unit and a multi-user power control unit. The channel condition estimation unit is arranged for determining a first SU-SINR, determining a second SU-SINR, and determining a channel orthogonality. The first SU-SINR pertains to a first radio channel between the first mobile terminal and the radio base station. The second SU-SINR pertains to a second radio channel between the second mobile terminal and the radio base station. The channel orthogonality is the degree of orthogonality between the first radio channel and the second radio channel. The multi-user power control unit is arranged for jointly determining a first power adjustment value and a second power adjustment value. The first power adjustment value pertains to the first mobile terminal. The second power adjustment value pertains to the second mobile terminal. The first power adjustment value and the second power adjustment value are determined based on the first SU-SINR, the second SU-SINR, and the channel orthogonality.

The SINR of a radio channel is to be understood as a measure of the SINR of a transmission originating from a mobile terminal and being received by a radio base station, which transmission is carried by the radio channel between the mobile terminal and the radio base station. The SU-SINR pertains to the transmission of a single mobile terminal in single-user mode, i.e., not utilizing MU-MIMO. In the present disclosure, the expressions SINR of a UE and SINR of a radio channel are used synonymously.

The present invention makes use of an understanding that the system gain resulting from uplink MU-MIMO transmissions may be improved by optimizing the transmission power of the mobile terminals engaged in MU-MIMO transmissions, i.e., the mobile terminals which are co-scheduled for transmission using a common time-frequency resource. By optimizing the transmission power of the co-scheduled mobile terminals, the potential loss in system gain due to the increase of intra-cell and inter-cell interference may be minimized. An embodiment of the present invention is further advantageous in that the quality of service (QoS) experience of co-scheduled users may be improved. Finally, uplink MU-MIMO power control in accordance with an embodiment of the invention is advantageous in that power optimization may be performed directly, without relying on a time consuming iterative procedure.

The transmission power of co-scheduled mobile terminals may be optimized by way of different schemes and/or criteria pertaining to system throughput, user throughput, QoS, air interface efficiency, and the like, in accordance with embodiments of the present invention, as described hereinafter. To this end, an embodiment of the invention may be applied to different scenarios, such as improving cell throughput or user QoS experience, or reducing harmful inter-cell interference.

According to an embodiment of the invention, the first power adjustment value and the second power adjustment value are determined based on a first MU-MIMO-SINR (MU-SINR) target and a second MU-SINR target. The first MU-SINR target pertains to the first radio channel. The second MU-SINR target pertains to the second radio channel. The first MU-SINR is the SINR of the first radio channel in MU-MIMO transmission mode after power control, i.e., after the transmit power of the first mobile terminal is adjusted by the first power adjustment value, and the transmit power of the second mobile terminal is adjusted by the second power adjustment value. Correspondingly, the second MU-SINR is the SINR of the second radio channel in MU-MIMO transmission mode after power control. Determining the first power adjustment value and the second power adjustment value based on MU-SINR targets for the two radio channels is advantageous in that the transmission power of the two mobile terminals may be adjusted so as to attain specific MU-SINR target values. Such MU-SINR targets may be set according to certain requirements. For instance, MU-SINR targets may be set so as to reduce transmission power, thereby minimizing harmful inter-cell interference. Alternatively, MU-SINR targets may be set so as to maintain the SINRs as in single-user transmission mode. In this way, frequent changes in QoS, which may be perceived unsatisfactorily by a user of the mobile terminal, may be avoided, or at least reduced, when repeatedly switching between single-user transmission and MU-MIMO transmission.

According to an embodiment of the invention, the first power adjustment value and the second power adjustment value are determined based on a power budget constraint while maximizing a transmission sum rate for the pair of mobile terminals. This is advantageous in that the transmission power of the co-scheduled mobile terminals may be optimized so as to maximize, or at least increase, the total transmission rate from the co-scheduled mobile terminals. In this respect, the total transmission rate is the sum of the transmission rates between each mobile terminal and the radio base station, i.e., the sum of the transmission rate over the first radio channel and the transmission rate over the second radio channel. This is advantageous in that performance may be optimized from a system point of view. Besides maximizing the transmission sum rate, an increase in inter-cell interference is avoided by imposing a power budget constraint.

According to an embodiment of the invention, the first SU-SINR, the second SU-SINR, and the channel orthogonality, are determined based on instantaneous radio channel conditions. This is advantageous in that power control in accordance with an embodiment of the invention takes into account the actual radio channel conditions. In that way, the available transmit power may be distributed between the co-scheduled mobile terminals with regard to radio channel conditions between the mobile terminals and the radio base station, the radio channel conditions being reflected by the first and the second SU-SINR, and the channel orthogonality. The first and the second SU-SINR, and the channel orthogonality, may, e.g., be determined from sounding reference signals (SRS) or demodulation reference signals (DMRS).

According to an embodiment of the invention, the method further comprises determining a first MU-SINR for the first radio channel, determining a second MU-SINR for the second radio channel, and evaluating whether to schedule the pair of mobile terminals for MU-MIMO transmissions. The evaluation, whether to schedule the pair of mobile terminals for MU-MIMO transmissions, is based on the first MU-SINR and the second MU-SINR. This is advantageous in that the potential gain from co-scheduling a pair of mobile terminals for MU-MIMO transmissions, which potential gain is represented by the first MU-SINR and the second MU-SINR, may be taken into consideration by the scheduler.

Even though advantages of the present invention have in some cases been described with reference to embodiments of the method according to the first aspect of the present invention, corresponding reasoning applies to embodiments of the radio base station according to the second aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

For the purpose of elucidating the present invention, the concept of MU-MIMO is described with reference to FIG. 1.

Figure 1:
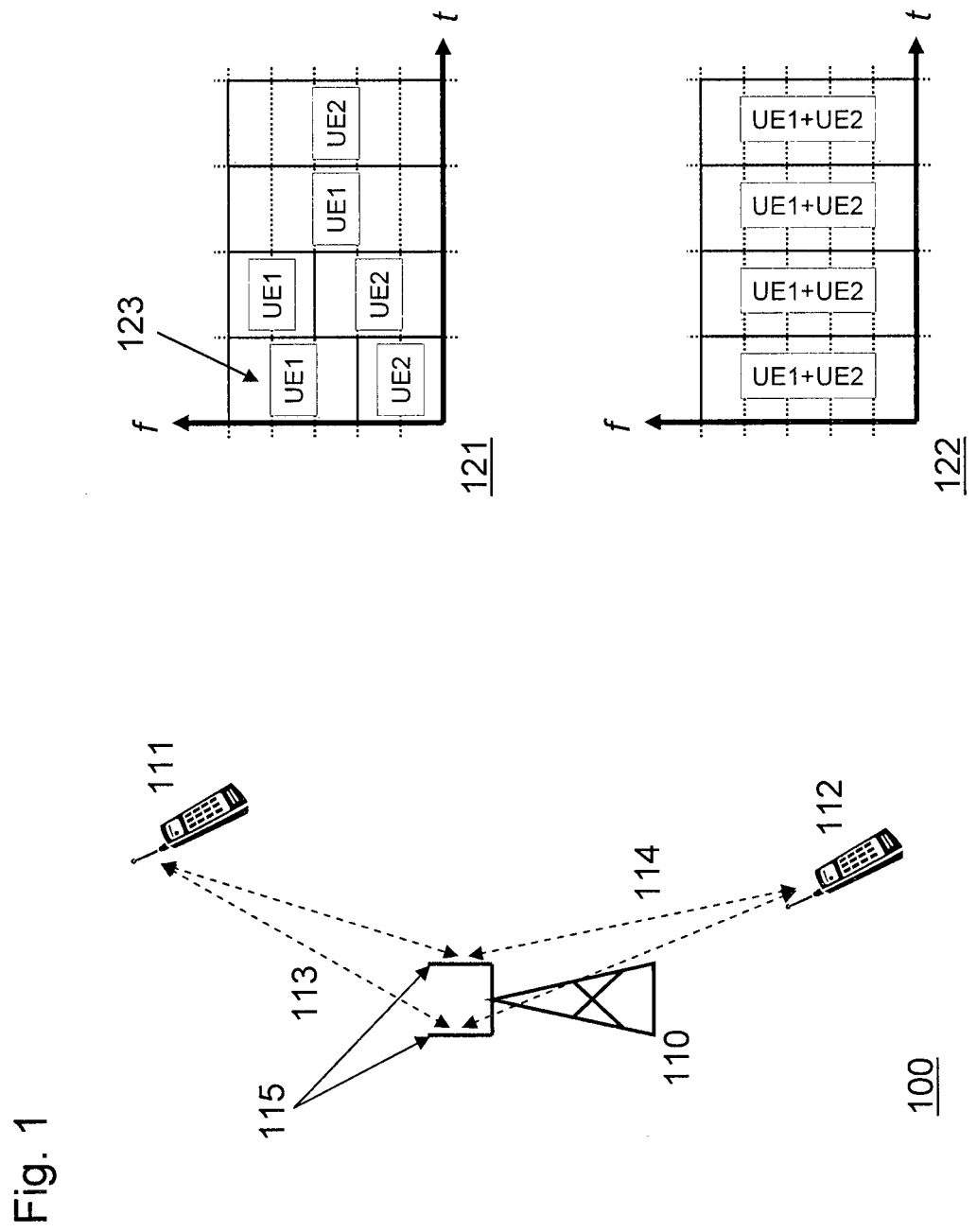
FIG. 1 illustrates the concept of MU-MIMO.

In FIG. 1, a communication system 100 capable of supporting MU-MIMO transmissions is illustrated. Communication system 100 may, e.g., be an LTE network comprising a radio base station 110, such as an eNode-B, which is engaged in wireless communications with a first UE 111 and a second UE 112. Wireless communications between eNode-B 110 and first UE 111 are effected over a first radio channel 113. Correspondingly, wireless communications between eNode-B 110 and second UE 112 are effected over a second radio channel 114.

Wireless communications between eNode-B 110 and first 111 and second UE 112 may be effected in the downlink, i.e., from eNode-B 110 to UEs 111 and 112, and in the uplink, i.e., from UEs 111 and 112 to eNode-B 110. In this respect, the term 'radio channel' is to be understood as comprising a plurality of physical channels, both in downlink and uplink, which may be used for transmitting user data, i.e., payload, as well as control signaling. In the LTE uplink, user data is transmitted on the physical uplink shared channel (PUSCH). Typically, in order to effect uplink transmissions in an LTE communication system, such as communication system 100, downlink control signaling is required.

In LTE communications, transmissions are scheduled on time-frequency resources, so called schedule blocks, which are assigned by a scheduler based on different criteria, such as an amount and a type of data to be transmitted, QoS, priority, and radio channel conditions. Scheduling for both downlink and uplink transmissions is performed on the network side, i.e., in the eNode-B. Thus, in order to enable uplink transmissions from UEs 111 and 112 to eNode-B 110, scheduling information is transmitted from eNode-B 110 to UEs 111 and 112 by means of downlink control signaling.

For the purpose of exemplifying the distinct transmission modes referred to in the present disclosure, single-user (SU) and MU-MIMO, the scheduling of first 111 and second UE 112 in time-frequency domain is illustrated in FIG. 1.

In SU transmission mode 121, each schedule block 123, corresponding to 180 kHz bandwidth during a 1 ms timeslot, is assigned to either first UE 111 (UE1) or second UE 112 (UE2), but not both UEs 111 and 112 simultaneously. For instance, in the first time slot, three schedule blocks are assigned to first UE 111 (UE1), and two schedule blocks are assigned to second UE 112 (UE2). In the next time slot, two schedule blocks are assigned to first UE 111 (UE1) and three schedule blocks are assigned to second UE 112 (UE2). In the third time slot, five schedule blocks are assigned to first UE 111 (UE1), and in the fourth time slot five schedule blocks are assigned to second UE 112 (UE2).

In MU-MIMO transmission mode 122, on the other hand, first UE 111 and second UE 112 are scheduled on common schedule blocks 123. For the scenario exemplified in 122, for all time slots, all schedule blocks 123 are assigned to both first 111 UE (UE1) and second UE 112 (UE2) simultaneously, i.e., UEs 111 and 112 are co-scheduled for transmission using common time-frequency resources.

Note that, whereas only five schedule blocks 123 are illustrated for each time slot in 121 and 122, the number of schedule blocks 123 which are available for transmission during any given time slot depends on the available bandwidth.

In order to separate the transmissions from first UE 111 and second UE 112 at eNode-B 110, MU-MIMO relies on significantly different spatial radio channels 113 and 114, and the availability of multiple receive antennas 115 at eNode-B 110.

Figure 2:
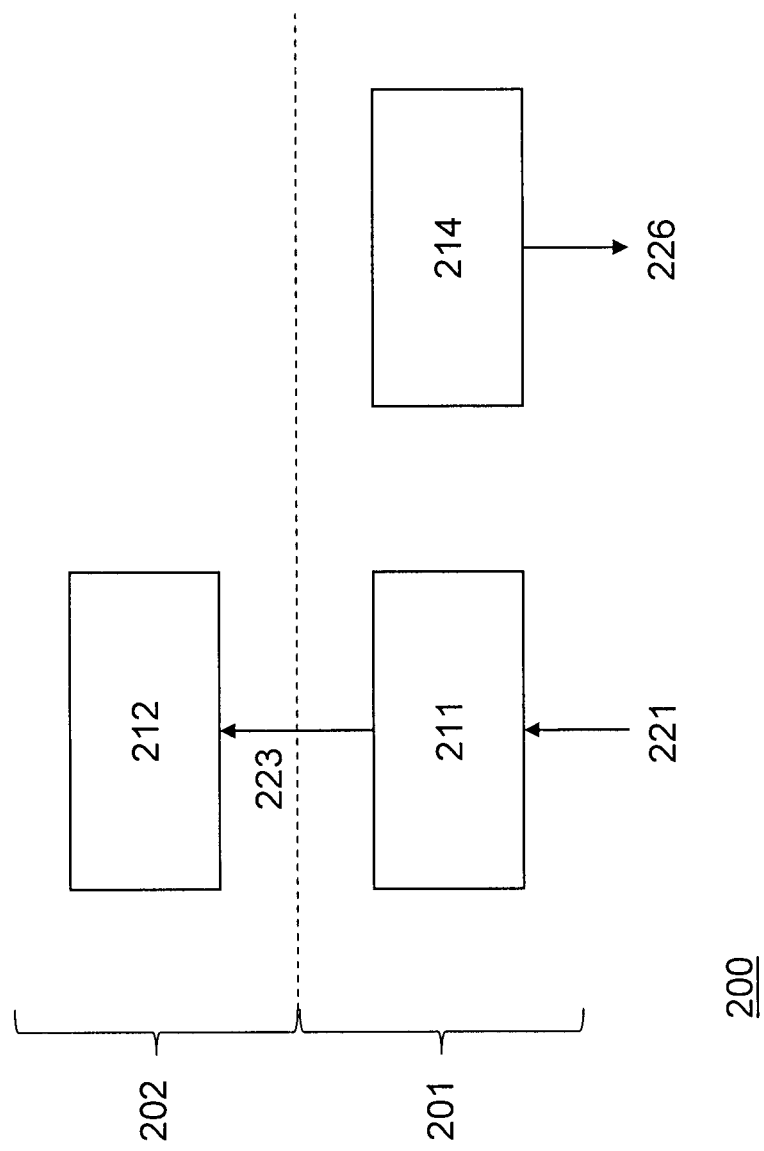
FIG. 2 is a known protocol stack of a radio base station for UL MU-MIMO transmissions.

In the following, uplink scheduling, as performed by a known eNode-B, is described with reference to FIG. 2. Note that FIG. 2 illustrates only those parts of an eNode-B which are necessary for describing functionality related to scheduling and power control, whereas other features are omitted for the sake of simplicity.

Typically, an eNode-B, such as eNode-B 110 described with reference to FIG. 1, comprises multiple antennas 115, transmitters and receivers, circuitry or processing means for data processing, and interfaces for interconnecting the eNode-B 110 with other eNode-Bs or a core network. The circuitry or processing means for data processing is arranged for implementing an LTE protocol stack, such as protocol stack 200 illustrated in FIG. 2, which comprises a physical layer 201 and a medium access control (MAC) layer 202.

In general, the physical layer of an LTE protocol stack, such as physical layer 201, typically performs tasks associated with mapping between transport channels and physical channels, error detection, forward error correction encoding/decoding, hybrid automatic repeat request (HARQ) processing, rate matching, modulation/demodulation, coding, power control, antenna mapping, and precoding. Further, the MAC layer of an LTE protocol stack, such as MAC layer 202, typically performs tasks related to mapping between logical channels and transport channels, multiplexing and demultiplexing, transport format selection, and scheduling.

More specifically, physical layer 201 comprises a channel condition estimation unit 211 which, based on instantaneous channel condition information 221 determined, e.g., from SRS or DMRS, estimates an SU-SINR for each UE and signals that information 223 to a scheduler 212 comprised in MAC layer 202. Physical layer 201 further comprises a power control unit 214 for controlling the transmission power of the UEs which are engaged in communications with the eNode-B by signaling power control commands 226 to such UEs.

Scheduler 212 is arranged for assigning schedule blocks to UEs for the purpose of uplink transmissions, i.e., for transmitting data from a UE to eNode-B 110. Scheduling is performed based on a number of parameters, such as channel condition information, i.e., SINR information 223 received from channel condition estimation unit 211, in addition to other information, e.g., the amount of data to be transmitted, the type of data to be transmitted, QoS requirements, priorities, and the like.

Typically, a known scheduler comprised in an MU-MIMO capable eNode-B performs the following steps. The scheme presented here is referred to as proportional pair scheduling in time and frequency (PFTF). Alternatively, similar schemes may be employed, such as round-robin or max-rate.

First, a list of scheduling candidates is generated. The candidate list comprises all users, i.e., UEs, having data for transmission, and all possible pairs of such UEs. In SU transmission mode, the list comprises only users and no pairs of users.

Then, while resources are available for uplink transmissions, such resources are allocated as follows:

For each candidate on the list, if the number of schedule blocks in the currently scheduled resource allocation has increased, the estimated throughput for all available resource allocations having one more schedule block than the currently scheduled resource allocation is calculated, and the best candidate is selected. The throughput is estimated based on the SINR of the resource allocation, where intra-cell interference is considered.

A PFTF weight is calculated as the number of bits gained by being scheduled the best resource allocation in comparison to the already scheduled resource allocation, divided by the average rate. For candidate pairs, the PFTF weight is the sum of the two UEs' respective weights. The candidate having the highest PFTF weight is selected and is assigned the best resource allocation.

Candidate pairs comprising one of the scheduled users are removed from the candidate list.

During the procedure outlined above, the transmission power of the scheduled UEs is not optimized.

In the following, an embodiment of the invention is described with reference to FIG. 3 and the PFTF scheme described hereinbefore. More specifically, a method 310 of power control for uplink MU-MIMO transmissions is presented.

First, in step 311, a candidate list of single UEs and UE pairs is compiled. In the next step 312, the SU-SINR for each UE is determined from channel conditions. Further, the channel orthogonality is determined for each candidate pair. Based on the SU-SINR values, the throughput is estimated for all candidates in the following step 313, and the best candidates are selected, i.e., scheduled for transmission. Depending 314 on the transmission mode of the scheduled UEs, i.e., SU or MU-MIMO, the method either returns to step 311 or continues to step 315. If 314 no UEs are scheduled for MU-MIMO transmissions, i.e., if only candidates comprising single UEs are scheduled, method 310 returns to step 311 and starts over again with evaluating candidates for the next time slot. If 314 at least one pair of UEs is scheduled for MU-MIMO transmissions, method 310 continues to step 315. In step 315, the first and the second power adjustment value are determined, based on the SU-SINRs and the channel orthogonality, and signaled to the UEs. Preferably, the power adjustment values are converted to power control in accordance with 3GPP specifications and signaled to the UEs.

Figure 3:
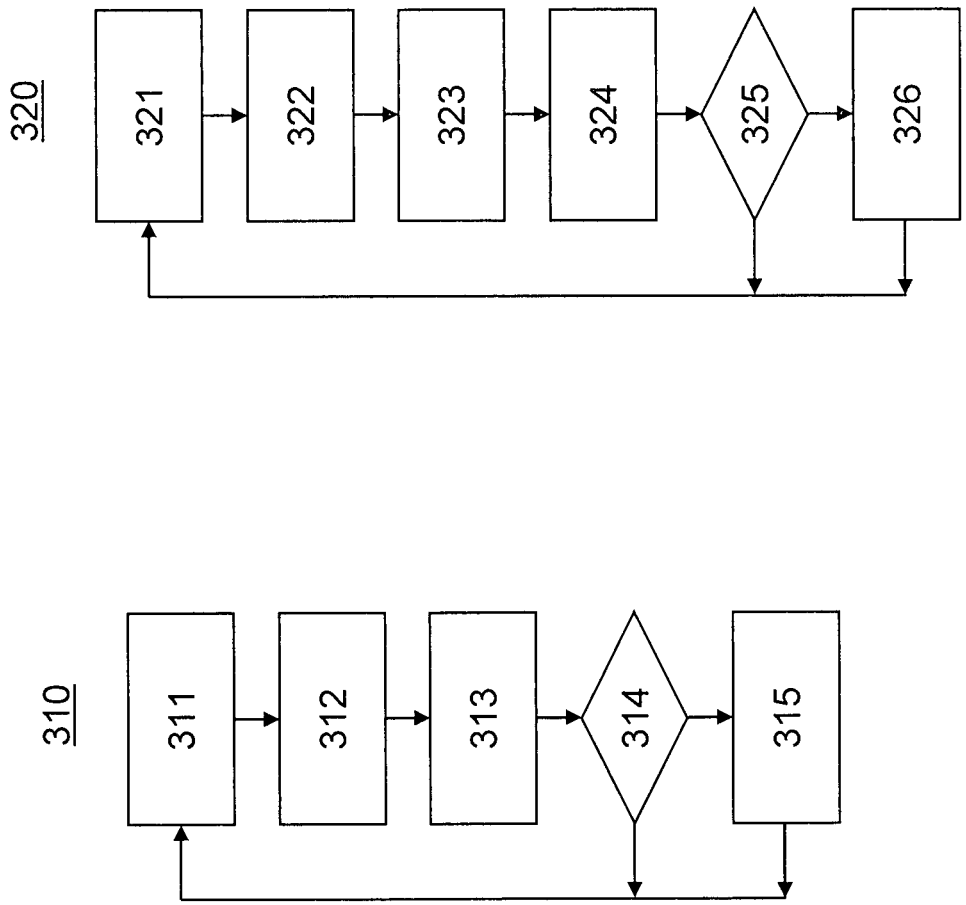
FIG. 3 illustrates a method of power control for UL-MIMO transmissions, in accordance with an embodiment of the invention.

Further with reference to FIG. 3 and the PFTF scheme described hereinbefore, another embodiment of the invention, an alternative method 320 of power control for uplink MU-MIMO transmissions, is presented.

First, in step 321, a candidate list of single UEs and UE pairs is compiled. In the next step 322, the SU-SINR for each UE is determined from channel conditions. Further, the channel orthogonality is determined for each candidate pair. In the following step 323, the first and the second power adjustment value are determined, based on the SU-SINRs and the channel orthogonality. Further, the MU-SINRs after power control are determined, as is described further below. Then, based on the SINR values, i.e., SU-SINR for single-UE candidates and MU-SINR for candidate pairs, the throughput is estimated for all candidates in the following step 324, and the best candidates are selected, i.e., scheduled for transmission. Depending 325 on the transmission mode of the scheduled UEs, i.e., SU or MU-MIMO, the method either returns to step 321 or continues to step 326.

If 325 no UEs are scheduled for MU-MIMO transmissions, i.e., if only candidates comprising single UEs are scheduled, method 320 returns to step 321 and starts over again with evaluating candidates for the next time slot. If 325 at least one pair of UEs is scheduled for MU-MIMO transmissions, method 320 continues to step 326. In step 326, the power adjustment values are signaled to the UEs. Preferably, the power adjustment values are converted to power control in accordance with 3GPP specifications and signaled to the UEs.

In order to elucidate the invention and its embodiments in more detail, a mathematical model of MU-MIMO transmissions between first UE 111 and eNode-B 111, as well as second UE 112 and eNode-B 110, is outlined in the following. While the equations derived here apply to a minimum mean square error (MMSE) based receiver, corresponding equations may easily be derived for other receiver concepts. Thus, the present invention is not limited to MMSE based receivers.

First, a per-UE expression for SINR is derived for MU-MIMO transmissions, i.e., the MU-SINR. Defining the channel vectors for first radio channel 113 and second radio channel 114 as $h_1(k)$ and $h_2(k)$, respectively, the channel vector for the combined MU-MIMO channel can be written as $$H(k) = (h_1(k), h_2(k)) \quad (1),$$

where k is the subcarrier index. In the remainder, it is assumed that the transmit signal-to-noise ratio is included in H(k).

The MU-SINR of first 113 and second radio channel 114, $\overline{S_1^{MU}}$ and $\overline{S_2^{MU}}$, may be derived from the following expression for the demodulated signals at first UE 111 and second UE 112, $\mu_1(k)$ and $\mu_2(k)$, respectively, $$\begin{pmatrix} \mu_1(k) \\ \mu_2(k) \end{pmatrix} = [H^H(k)H(k) + I(k)]^{-1} \begin{pmatrix} h_1^H(k) \\ h_2^H(k) \end{pmatrix} h_1(k), \quad (2)$$

which, after some algebra, can be written as $$\begin{pmatrix} \mu_1(k) \\ \mu_2(k) \end{pmatrix} = \begin{pmatrix} \dfrac{h_2^H(k)h_2(k)h_1^H(k)h_1(k) + h_1^H(k)h_1(k) - h_1^H(k)h_2(k)h_2^H(k)h_1(k)}{(h_1^H(k)h_1(k)+1)(h_2^H(k)h_2(k)+1) - h_1^H(k)h_2(k)h_2^H(k)h_1(k)} \\ \dfrac{-h_2^H(k)h_1(k)h_1^H(k)h_1(k) + h_1^H(k)h_1(k)h_2^H(k)h_1 + (k)h_2^H(k)h_1(k)}{(h_1^H(k)h_1(k)+1)(h_2^H(k)h_2(k)+1) - h_1^H(k)h_2(k)h_2^H(k)h_1(k)} \end{pmatrix}. \quad (3)$$

The MU-SINR for first radio channel 113 can be expressed as $$\overline{S_1^{MU}} = \frac{\dfrac{1}{N}\sum_{k=0}^{N-1} \mu_1(k)}{\dfrac{1}{N}\sum_{k=0}^{N-1}[1-\mu_1(k)]}, \quad (4)$$

where the sum extends over all N subcarriers. In Eq. (4), the inter-cell interference is treated as white noise, which is a reasonable approximation since MU-MIMO is typically used in the high-SINR region where intra-cell interference is dominant.

Using Eq. (3), the MU-SINR for first radio channel 113, Eq. (4), may be written as $$\overline{S_1^{MU}} = \frac{\dfrac{1}{N}\sum_{k=0}^{N-1} \dfrac{|h_1(k)|^2 + |h_1(k)|^2|h_2(k)|^2 - h_1^H(k)h_2(k)h_2^H(k)h_1(k)}{(|h_1(k)|^2+1)(|h_2(k)|^2+1) - h_1^H(k)h_2(k)h_2^H(k)h_1(k)}}{\dfrac{1}{N}\sum_{k=0}^{N-1} \dfrac{|h_2(k)|^2 + 1}{(|h_1(k)|^2+1)+(|h_2(k)|^2+1) - h_1^H(k)h_2(k)h_2^H(k)h_1(k)}}. \quad (5)$$

Now, the MU-SINR for first UE 111 after power control in accordance with an embodiment of the invention, $\overline{S_1^{MU,pc}}$, can be calculated by replacing $h_1 \rightarrow \sqrt{\alpha_1} h_1$ and $h_2 \rightarrow \sqrt{\alpha_2} h_2$ in Eq. (5), i.e., $$\overline{S_1^{MU,pc}} = \frac{\frac{1}{N}\sum_{k=0}^{N-1} \frac{\alpha_1|h_1(k)|^2 + \alpha_1\alpha_2|h_1(k)|^2|h_2(k)|^2 - \frac{\alpha_1\alpha_2 h_1^H(k)h_2(k)h_2^H(k)h_1(k)}{(\alpha_1|h_1(k)|^2+1)+(\alpha_2|h_2(k)|^2+1)-\alpha_1\alpha_2 h_1^H(k)h_2(k)h_2^H(k)h_1(k)}}{\frac{1}{N}\sum_{k=0}^{N-1} \frac{\alpha_2|h_2(k)|^2+1}{(\alpha_1|h_1(k)|^2+1)+(\alpha_2|h_2(k)|^2+1)-\alpha_1\alpha_2 h_1^H(k)h_2(k)h_2^H(k)h_1(k)}}. \quad (6)$$

Note that $\alpha_1$ and $\alpha_2$ are defined to be linear power adjustment values, i.e., the transmission power $P_1$ of first UE 111 is adjusted to be $\alpha_1 P_1$ after power control, and correspondingly for second UE 112.

In order to simplify Eq. (6), an approximation is made which is first derived for the simpler scenario of SU-SIMO transmissions, for which the per-UE SINR can be expressed as $$\overline{S_{SU}} = \frac{\frac{1}{N}\sum_{k=0}^{N-1}\frac{|h(k)|^2}{|h(k)|^2+1}}{\frac{1}{N}\sum_{k=0}^{N-1}\frac{1}{|h(k)|^2+1}}, \quad (7)$$

where h(k) is the channel vector and N is the number of subcarriers. Taking into account the power adjustment value $\alpha$, i.e., replacing $h \rightarrow \sqrt{\alpha} h$, yields $$\overline{S_{SU}} = \alpha \times \frac{\frac{1}{N}\sum_{k=0}^{N-1}\frac{|h(k)|^2}{\alpha|h(k)|^2+1}}{\frac{1}{N}\sum_{k=0}^{N-1}\frac{1}{\alpha|h(k)|^2+1}}, \quad (8)$$

which may be approximated by $$\overline{S_{SU}} \cong \alpha \times \frac{\frac{1}{N}\sum_{k=0}^{N-1}\frac{|h(k)|^2}{|h(k)|^2+1}}{\frac{1}{N}\sum_{k=0}^{N-1}\frac{1}{|h(k)|^2+1}}. \quad (9)$$

In Eq. (9), it is assumed that approximating the denominators $(\alpha|h(k)|^2+1)$ by $(|h(k)|^2+1)$ has only negligible impact on the ratio in Eq. (9), which is mainly dictated by the two numerators, $|h(k)|^2$ and 1.

Applying the same approximation as for the SU-SIMO case, Eq. (9), to Eq. (6), the MU-SINR for first UE 111 after power control, Eq. (6), can be calculated as $$\overline{S_1^{MU,pc}} \cong \frac{\frac{1}{N}\sum_{k=0}^{N-1}\frac{\alpha_1 S_1(k) + \alpha_1\alpha_2 S_1(k)S_2(k) - \alpha_1\alpha_2 \Delta(k)S_1(k)S_2(k)}{R(k)}}{\frac{1}{N}\sum_{k=0}^{N-1}\frac{\alpha_2 S_2(k)+1}{R(k)}}, \quad (10)$$

where the following definitions for per-subcarrier values have been used:

$$S_1(k) \equiv h_1^H h_1, \quad (11a)$$

$$S_2(k) \equiv h_2^H h_2, \text{ and} \quad (11b)$$

$$\Delta(k) \equiv \frac{h_1^H h_2 h_2^H h_1}{h_1^H h_1 h_2^H h_2}, \text{ and} \quad (11c)$$

$$R(k) \equiv (S_1(k)+1)(S_2(k)+1) - \Delta(k)S_1(k)S_2(k). \quad (12)$$

Eq. (10) may be rearranged to read $$\overline{S_1^{MU,pc}} \cong \frac{\alpha_1 \frac{\frac{1}{N}\sum_{k=0}^{N-1}\frac{S_1(k)}{R(k)}}{\frac{1}{N}\sum_{k=0}^{N-1}\frac{1}{R(k)}} + \alpha_1\alpha_2 \frac{\frac{1}{N}\sum_{k=0}^{N-1}\frac{S_1(k)S_2(k)-\Delta(k)S_1(k)S_2(k)}{R(k)}}{\frac{1}{N}\sum_{k=0}^{N-1}\frac{1}{R(k)}}}{\alpha_2 \frac{\frac{1}{N}\sum_{k=0}^{N-1}\frac{S_2(k)}{R(k)}}{\frac{1}{N}\sum_{k=0}^{N-1}\frac{1}{R(k)}} + \frac{\frac{1}{N}\sum_{k=0}^{N-1}\frac{1}{R(k)}}{\frac{1}{N}\sum_{k=0}^{N-1}\frac{1}{R(k)}}}. \quad (13)$$

Using the following definitions for expressing the per-UE values for the first SU-SINR $\overline{S_1}$, the second SU-SINR $\overline{S_2}$, and channel orthogonality $\overline{\Delta}$, in terms of their per-subcarrier equivalents $S_1(k)$, $S_2(k)$, and $\Delta(k)$, Eqs. (11a-c) and (12), respectively, $$\overline{S_1} \equiv \frac{1}{N}\sum_{k=0}^{N-1}\frac{S_1(k)}{R(k)}, \quad (14a)$$

$$\overline{S_2} \equiv \frac{1}{N}\sum_{k=0}^{N-1}\frac{S_2(k)}{R(k)}, \text{ and} \quad (14b)$$

$$\overline{\Delta} \equiv 1 - \frac{\sum_{k=0}^{N-1}\frac{S_1(k)S_2(k)-\Delta(k)S_1(k)S_2(k)}{R(k)}}{\overline{S_1}\overline{S_2}}, \quad (14c)$$

Eq. (13) can be written as $$\overline{S_1^{MU,pc}} \cong \alpha_1 \overline{S_1} - \frac{\overline{\Delta}\alpha_1\alpha_2\overline{S_1}\overline{S_2}}{\alpha_2\overline{S_2}+1}. \quad (15)$$

In general, $\overline{S_1}$, $\overline{S_2}$, and $\overline{\Delta}$, are functions of $S_1(k)$, $S_2(k)$, and $\Delta(k)$, respectively, averaged over all subcarriers k allocated to a specific UE. The exact form of transforming per-subcarrier values to per-UE values may depend on implementation. Therefore, the transformation presented here is only an example, and the present invention is not limited to this particular way of transforming per-subcarrier values to per-UE values.

Eq. (15) is the expression used for calculating the MU-SINR for first UE 111 after power control. A corresponding expression may be derived for the MU-SINR for second UE 112 after power control, $$\overline{S_2^{MU,pc}} \cong \alpha_2 \overline{S_2} - \frac{\overline{\Delta} \alpha_1 \alpha_2 \overline{S_1 S_2}}{\alpha_1 \overline{S_1} + 1}. \tag{16}$$

Using Eqs. (15) and (16), first and second power adjustment values $\alpha_1$ and $\alpha_2$ may be determined in accordance with embodiments of the invention, as is elucidated below. Further, Eqs. (15) and (16) may be used for calculating the UEs' MU-SINRs after power control, and $\overline{S_1^{MU,pc}}$ and $\overline{S_2^{MU,pc}}$. Optionally, these values may be taken into consideration during the scheduling process, as was described with reference to FIG. 3.

In accordance with an embodiment of the invention, the first and the second power adjustment value are jointly determined based on MU-SINR targets for the co-scheduled UEs. More specifically, a first MU-SINR target for first UE 111 may be expressed as $\phi_1 \overline{S_1}$. Correspondingly, a second MU-SINR target for second UE 112 may be expressed as $\phi_2 \overline{S_2}$. Using $\phi_1$ and $\phi_2$, the first and the second MU-SINR target may be expressed in terms of the UEs' respective SU-SINR, i.e., the SINRs before switching to MU-MIMO transmission mode. The targets may be set according to different criteria. For instance, the first and the second MU-SINR target may be set so as to maintain the UEs' respective SINR as in SU transmission mode, i.e., $\phi_1=1$ and $\phi_2=1$. In that way, QoS fluctuations may be avoided. Alternatively, the first and the second MU-SINR target may be reduced, as compared to the SU-SINR values, so as to reduce harmful inter-cell interference, i.e., $\phi_1<1$ and $\phi_2<1$.

The problem of deriving equations for $\alpha_1$ and $\alpha_2$ amounts to setting target values for the UEs' MU-SINR after power adjustment, i.e., $\overline{S_1^{MU,pc}}$ and $\overline{S_2^{MU,pc}}$ (Eqs. (15) and (16)):

$$\phi_1 \overline{S_1} = \alpha_1 \overline{S_1} - \frac{\overline{\Delta} \alpha_1 \alpha_2 \overline{S_1 S_2}}{\alpha_1 \overline{S_2} + 1} \text{ and} \tag{17}$$

$$\phi_2 \overline{S_2} = \alpha_2 \overline{S_2} - \frac{\overline{\Delta} \alpha_1 \alpha_2 \overline{S_1 S_2}}{\alpha_2 \overline{S_1} + 1},$$

which may be rearranged to read $$\frac{\phi_1}{\alpha_1} = 1 - \frac{\overline{\Delta} \alpha_1 \alpha_2 \overline{S_2}}{\alpha_1 \overline{S_2} + 1} \text{ and } \frac{\phi_2}{\alpha_2} = 1 - \frac{\overline{\Delta} \alpha_1 \alpha_2 \overline{S_2}}{\alpha_2 \overline{S_1} + 1}. \tag{18}$$

Replacing $1/\alpha_1 \to \beta_1$ and $1/\alpha_2 \to \beta_2$, and combining the resulting equations, yields $$\beta_2 = \frac{1}{\phi_2} - \frac{\overline{\Delta} \overline{S_1}}{\phi_2 \overline{S_1} + \frac{\phi_2}{\phi_1} - \frac{\phi_2 \overline{\Delta} \overline{S_2}}{\phi_1 \overline{S_2} + \phi_1 \beta_2}}. \tag{19}$$

Eq. (19) is a quadratic equation in one variable which may be solved to obtain equations for the first power adjustment value, $$\alpha_1 = -b_1 + \sqrt{b_1^2 - 4a_1 c_1}/2a_1 \tag{20a), with}$$

$$a_1 = -\phi_1 \phi_2 (\overline{S_2} + 1/\phi_2) \tag{20b},$$

$$b_1 = \phi_1 \phi_2 (\overline{S_2} + 1/\phi_2)(1/\phi_1 - \overline{S_1}) + \overline{\Delta}(\phi_1 \overline{S_1} - \phi_2 \overline{S_2}) \tag{20c), and}$$

$$c_1 = \phi_2 \overline{S_1}(\overline{S_2} + 1/\phi_2)(1 - \overline{\Delta}) \tag{20d}$$

and the second power adjustment value, $$\alpha_2 = -b_2 + \sqrt{b_2^2 - 4a_2 c_2}/2a_2 \tag{21a), with}$$

$$a_2 = -\phi_1 \phi_2 (\overline{S_1} + 1/\phi_1) \tag{21b},$$

$$b_2 = \phi_1 \phi_2 (\overline{S_1} + 1/\phi_1)(1/\phi_2 - \overline{S_2}) + \overline{\Delta}(\phi_2 \overline{S_2} - \phi_1 \overline{S_1}) \tag{21c), and}$$

$$c_2 = \phi_1 \overline{S_2}(\overline{S_1} + 1/\phi_1)(1 - \overline{\Delta}) \tag{21d}.$$

Using Eqs. (20a-d) and (21a-d), the first and the second power adjustment value may easily be calculated if the MU-SINR targets, expressed by $\phi_1$ and $\phi_2$, are known. The only input which is needed are the per-UE SU-SINR values for the first and the second radio channel, $\overline{S_1}$ and $\overline{S_2}$, as well as the per-UE channel orthogonality $\overline{\Delta}$, as defined by Eqs. (14a-c). These values may be determined based on instantaneous radio channel conditions, as was described hereinbefore.

In the following, another embodiment of the invention, for jointly determining the first and the second power adjustment value, is presented. More specifically, the first and the second power adjustment value are determined so as to maximize a transmission sum rate for the pair of UEs, i.e., the sum of the transmission rate over the first radio channel and that over the second radio channel, while maintaining a power budget constraint K. This is a way of optimizing the performance of MU-MIMO transmissions from a system point of view. The power budget constraint is used to avoid increasing inter-cell interference.

To this end, jointly determining $\alpha_1$ and $\alpha_2$ amounts to solving $$\max_{\alpha_1 \alpha_2 = K}[1 + \overline{S_1^{MU,pc}}][1 + \overline{S_2^{MU,pc}}] \tag{22},$$

where the sum throughput is modeled as a product of two factors, one for each UE, wherein each factor has the form (1+SINR), corresponding to the Shannon capacity expression. K is a constant used to constrain the UEs' transmit power in order to limit inter-cell interference, and is defined as $$K \equiv \alpha_1 \alpha_2 \tag{23}.$$

In practice, the power constraint results in a vanishing sum of power control adjustments sent to the UEs. In other words, if the first UE increases its transmit power by a certain amount, the second UE decreases its transmit power by the same amount.

Using Eqs. (15) and (16), Eq. (22) may be written as $$\max_{\alpha_1\alpha_2 \leq K}\left[1+\alpha_1\bar{S}_1\left(1-\frac{\bar{\Delta}\alpha_2\bar{S}_2}{\alpha_2\bar{S}_2+1}\right)\right]\left[1+\alpha_2\bar{S}_2\left(1-\frac{\bar{\Delta}\alpha_1\bar{S}_1}{\alpha_1\bar{S}_1+1}\right)\right]. \quad (24)$$

Eq. (24) may be solved by replacing $(1-\bar{\Delta})\to\xi$, yielding $$\max_{\alpha_1,\alpha_2}\frac{(1+\xi)\alpha_2\bar{S}_2+2}{\alpha_2\bar{S}_2+1}\cdot\frac{(1+\xi)\alpha_1\bar{S}_1+2}{\alpha_1\bar{S}_1+1}, \quad (25)$$

which is equal to $$\max_{\alpha_1,\alpha_2}\frac{(1+\xi)(K\bar{S}_1\bar{S}_2+2\alpha_1\bar{S}_1+2\alpha_2\bar{S}_2)+4}{K\bar{S}_1\bar{S}_2+\alpha_1\bar{S}_1+\alpha_2\bar{S}_2+1}. \quad (26)$$

The latter is equivalent to $$\min_{\alpha_1,\alpha_2}\alpha_1\bar{S}_1+\alpha_2\bar{S}_2 \quad (27).$$

Thus, the sum throughput is maximized, while maintaining the power constraint, under the condition that $$\alpha_1\bar{S}_1=\alpha_2\bar{S}_2 \quad (28),$$

which yields, using Eq. (23), $$\alpha_1=\sqrt{K\bar{S}_2/\bar{S}_1} \text{ and } \alpha_2=\sqrt{K\bar{S}_1/\bar{S}_2} \quad (29).$$

Using Eqs. (29), the first and the second power adjustment value may easily be calculated using the power budget constraint K as well as the per-UE SU-SINRs for the first and the second UE, $\bar{S}_1$ and $\bar{S}_2$, as an input. The power budget constraint K may be chosen so as to maintain the same inter-cell interference as in SU transmission mode (K=1), to reduce interference (K<1), or to increase the sum throughput (K>1).

In the following, an eNode-B in accordance with an embodiment of the invention is described with reference to FIG. 4. Note that FIG. 4 illustrates only those parts of an eNode-B which are necessary for describing the present invention, whereas other parts are omitted for the sake of simplicity.

Typically, an eNode-B, comprises multiple antennas, transmitters and receivers, circuitry or processing means for data processing, and interfaces for interconnecting the eNode-B with other eNode-Bs or a core network. The circuitry or processing means for data processing is arranged for implementing an LTE protocol stack, such as protocol stack 400 illustrated in FIG. 4.

Figure 4:
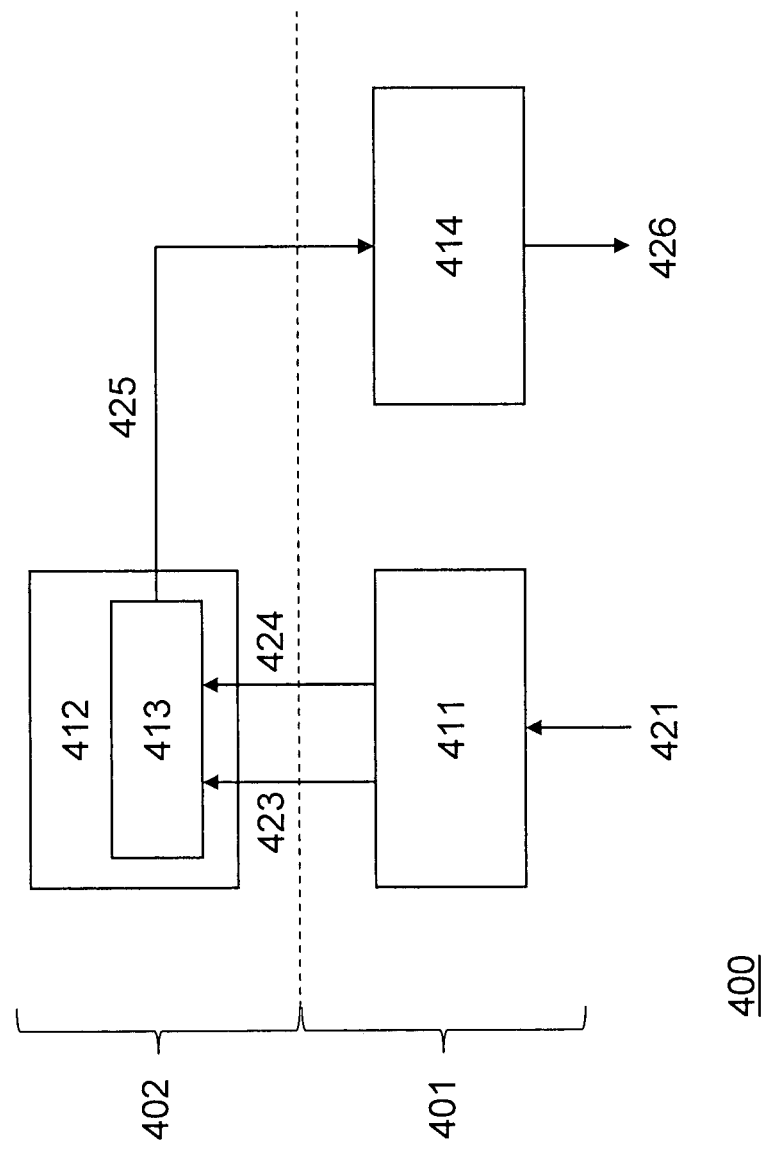
FIG. 4 is a protocol stack of a radio base station for UL MU-MIMO transmissions with power control, in accordance with an embodiment of the invention.

FIG. 4 illustrates a protocol stack 400 of an eNode-B capable of supporting uplink MU-MIMO transmissions from a pair of co-scheduled UEs, as was described with reference to FIG. 1. Protocol stack 400 has certain features in common with known protocol stack 200, described with reference to FIG. 2. More specifically, protocol stack 400 comprises a physical layer 401 and a MAC layer 402. Physical layer 401 comprises a channel condition estimation unit 411 which, based on instantaneous channel condition information 421 determined from SRS or DMRS, estimates and signals SU-SINR information 423 to scheduler 412 comprised in MAC layer 402. Physical layer 401 further comprises a power control unit 414 for controlling the UEs' transmission power by signaling control information 426 to UEs in communication with the eNode-B.

Protocol stack 400 differs from protocol stack 200 in that channel condition estimation unit 411 is further arranged for estimating the channel orthogonality from instantaneous channel condition information 421 and signaling 424 the estimated channel orthogonality to scheduler 412.

Protocol stack 400 further comprises a multi-user power control (MUPC) unit 413, which in FIG. 4 is illustrated as being arranged with scheduler 412. MUPC unit 413 is arranged for, if a least one pair of UEs is scheduled for uplink MU-MIMO transmissions, estimating an MU-SINR for each co-scheduled UE, i.e., and for adjusting the transmission power of the co-scheduled UEs, as was described hereinbefore. In particular, MUPC unit 413 is arranged for jointly determining the first and the second power adjustment value based on the first and the second SU-SINR and the channel orthogonality. For instance, MUPC unit 413 may be arranged for calculating the first and the second power adjustment value, using Eqs. (20a-d) and (21a-d), if MU-SINR targets for the co-scheduled UEs are known. The MU-SINR targets may be set according to different criteria, as was discussed hereinbefore. Alternatively, MUPC unit 413 may be arranged for calculating the first and the second power adjustment value using Eqs. (29), if the power budget constraint K is known. The power budget constraint may be chosen so as to maintain the same inter-cell interference as in SU transmission mode (K=1), to reduce interference (K<1), or to increase the sum throughput (K>1).

MUPC unit 413 is further arranged for signaling power control information 425 to power control unit 414, which, in turn, controls the transmission power of the co-scheduled UEs by signaling power control commands 426. In particular, the first and second power adjustment values, which are linear values, are converted to power control commands in accordance with 3GPP specifications and signaled to the UEs which are scheduled for MU-MIMO transmissions. Since the power control commands in LTE are defined to be 2-bit commands, which may represent any one of four discrete values expressing a power adjustment of $\{-1, 0, 1, 3\}$ dB, $\alpha_1$ and $\alpha_2$ should be quantized accordingly.

Scheduler 412 is arranged for assigning schedule blocks, as was described with reference to FIG. 1, to UEs which are engaged in communication with eNode-B 110. Scheduling is performed, if in SU transmission mode, based on SU-SINR information 423 received from SINR estimation unit 411, in addition to other information, such as an amount of data to be transmitted, a type of data to be transmitted, QoS requirements, and the like. When in MU-MIMO mode, scheduling is performed based on MU-SINR information received from MUPC unit 413, in addition to other information, such as an amount of data to be transmitted, a type of data to be transmitted, QoS requirements, and the like. The decision, whether to schedule a pair of UEs for MU-MIMO transmissions or not, is taken by scheduler 412.

The person skilled in the art realizes that the present invention by no means is limited to the embodiments described above. On the contrary, many modifications and variations are possible within the scope of the appended claims. For example, the MUPC unit may be arranged in the physical layer of an LTE protocol stack.

In conclusion, a method of power control for MU-MIMO transmissions between a pair of mobile terminals and a radio base station is provided. The method comprises determining SINRs for the radio channels between the mobile terminals and the radio base station, determining a channel orthogonality between the radio channels, and jointly determining, based on the SINRs and the channel orthogonality, power adjustment values for the mobile terminals. The present invention makes use of an understanding that the system gain resulting from MU-MIMO transmissions may be improved by optimizing the transmission power of the co-scheduled mobile terminals. For instance, the power adjustment values may be determined so as to attain certain SINR targets. Alternatively, the power adjustment values may be determined so as to maximize the throughput while maintaining a power budget constraint. Further, a radio base station for MU-MIMO transmissions is provided.

The invention claimed is:

1. A method of power control for uplink multi-user multi-input multi-output (MU-MIMO) wireless transmissions between a pair of mobile terminals, the pair of mobile terminals comprising a first mobile terminal and a second mobile terminal, and a radio base station, the method comprising:
    determining a first single-user signal-to-interference-noise ratio, SU-SINR, $\overline{S_1}$, for a first radio channel between the first mobile terminal and the radio base station,
    determining a second SU-SINR, $\overline{S_2}$, for a second radio channel between the second mobile terminal and the radio base station,
    determining a channel orthogonality, $\overline{\Delta}$ between the first radio channel and the second radio channel, and
    jointly determining, based on the first SU-SINR, the second SU-SINR, and the channel orthogonality, a first power adjustment value, $\alpha_1$, for the first mobile terminal and a second power adjustment value, $\alpha_2$, for the second mobile terminal, wherein the first power adjustment value and the second power adjustment value are determined based on a power budget constraint, K, while maximizing a transmission sum rate for the pair of mobile terminals.

2. The method according to claim 1, wherein the first power adjustment value and the second power adjustment value are determined based on a first MU-MIMO-SINR, MU-SINR, target, $\phi_1 \overline{S_1}$, for the first radio channel and a second MU-SINR target, $\phi_2 \overline{S_2}$, for the second radio channel.

3. The method according to claim 2, wherein $\alpha_1 = -b_1 + \sqrt{b_1^2 - 4\alpha_1 c_1}/2\alpha_1$, where $\alpha_1 = -\phi_1 \phi_2 (\overline{S_2} + 1/\phi_2)$, $b_1 = \phi_1 \phi_2 (\overline{S_2} + 1/\phi_2)(1/\phi_1 - \overline{S_1}) + \overline{\Delta}(\phi_1 \overline{S_1} - \phi_2 \overline{S_2})$, $c_1 = \phi_2 \overline{S_1}(\overline{S_2} + 1/\phi_2)(1 - \overline{\Delta})$, and $\alpha_2 = -b_2 + \sqrt{b_2^2 - 4\alpha_2 c_2}/2\alpha_2$, where $\alpha_2 = -\phi_1 \phi_2 (\overline{S_1} + 1/\phi_1)$, $b_2 = \phi_1 \phi_2 (\overline{S_1} + 1/\phi_1)(1/\phi_2 - \overline{S_2}) + \overline{\Delta}(\phi_2 \overline{S_2} - \phi_1 \overline{S_1})$, $c_2 = \phi_1 \overline{S_2}(\overline{S_1} + 1/\phi_1)(1 - \overline{\Delta})$.

4. The method according to claim 1, wherein $\alpha_1 = \sqrt{K \overline{S_2}/\overline{S_1}}$ and $\alpha_2 = \sqrt{K \overline{S_1}/\overline{S_2}}$.

5. The method according to claim 1, wherein the first SU-SINR, the second SU-SINR, and the channel orthogonality, are determined based on instantaneous conditions of the first radio channel and the second radio channel.

6. The method according to claim 1, further comprising:
    determining, based on the first SU-SINR, the second SU-SINR, the channel orthogonality, the first power adjustment value, and the second power adjustment value, a first MU-SINR, $\overline{S_1^{MU,pc}}$, for the first radio channel and a second MU-SINR, $\overline{S_2^{MU,pc}}$, for the second radio channel, and
    evaluating, based on the first MU-SINR and the second MU-SINR, whether to schedule the pair of mobile terminals for MU-MIMO transmissions.

7. A radio base station being arranged for uplink multi-user multi-input multi-output (MU-MIMO) wireless transmissions between a pair of mobile terminals, the pair of mobile terminals comprising a first mobile terminal and a second mobile terminal, and the radio base station, the radio base station comprising:
    a channel condition estimation unit being arranged for:
        determining a first single-user signal-to-interference-noise ratio, SU-SINR, $\overline{S_1}$ for a first radio channel between the first mobile terminal and the radio base station,
        determining a second SU-SINR $\overline{S_2}$ for a second radio channel between the second mobile terminal and the radio base station, and
        determining a channel orthogonality $\overline{\Delta}$ between the first radio channel and the second radio channel, and
    a multi-user power control (MUPC) unit being arranged for jointly determining, based on the first SU-SINR, the second SU-SINR, and the channel orthogonality, a first power adjustment value $\alpha_1$ for the first mobile terminal and a second power adjustment value $\alpha_2$ for the second mobile terminal, wherein
    the MUPC unit is arranged for determining the first power adjustment value and the second power adjustment value based on a power budget constraint K while maximizing a transmission sum rate for the pair of mobile terminals.

8. The radio base station according to claim 7, wherein the MUPC unit is arranged for determining the first power adjustment value and the second power adjustment value based on a first MU-MIMO-SINR, MU-SINR, target $\phi_1 \overline{S_1}$ for the first radio channel and a second MU-SINR target $\phi_2 \overline{S_2}$ for the second radio channel.

9. The radio base station according to claim 8, wherein $\alpha_1 = -b_1 + \sqrt{b_1^2 - 4\alpha_1 c_1}/2\alpha_1$, where $\alpha_1 = -\phi_1 \phi_2 (\overline{S_2} + 1/\phi_2)$, $b_1 = \phi_1 \phi_2 (\overline{S_2} + 1/\phi_2)(1/\phi_1 - \overline{S_1}) + \overline{\Delta}(\phi_1 \overline{S_1} - \phi_2 \overline{S_2})$, $c_1 = \phi_2 \overline{S_1}(\overline{S_2} + 1/\phi_2)(1 - \overline{\Delta})$, and $\alpha_2 = -b_2 + \sqrt{b_2^2 - 4\alpha_2 c_2}/2\alpha_2$, where $\alpha_2 = -\phi_1 \phi_2 (\overline{S_1} + 1/\phi_1)$, $b_2 = \phi_1 \phi_2 (\overline{S_1} + 1/\phi_1)(1/\phi_2 - \overline{S_2}) + \overline{\Delta}(\phi_2 \overline{S_2} - \phi_1 \overline{S_1})$, $c_2 = \phi_1 \overline{S_2}(\overline{S_1} + 1/\phi_1)(1 - \overline{\Delta})$.

10. The radio base station according to claim 7, wherein $\alpha_1 = \sqrt{K \overline{S_2}/\overline{S_1}}$ and $\alpha_2 = \sqrt{K \overline{S_1}/\overline{S_2}}$.

11. The radio base station according to claim 7, wherein the channel condition estimation unit is arranged for determining the first SU-SINR, the second SU-SINR, and the channel orthogonality, based on instantaneous conditions of the first radio channel and the second radio channel.

12. The radio base station according to claim 7, wherein the channel condition estimation unit is further arranged for:
    determining, based on the first SU-SINR, the second SU-SINR, the channel orthogonality, the first power adjustment value, and the second power adjustment value, a first MU-MIMO-SINR, MU-SINR, $\overline{S_1^{MU,pc}}$, for the first radio channel and a second MU-SINR, $\overline{S_2^{MU,pc}}$, for the second radio channel,
    and wherein the radio base station further comprises:
    a scheduler being arranged for evaluating, based on the first MU-SINR and the second MU-SINR, whether to schedule the pair of mobile terminals for MU-MIMO transmissions.

* * * * *